Nov. 29, 1949 W. L. TISDALE ET AL 2,489,834
POWER DRIVE PEANUT SHAKER
Filed March 24, 1947 3 Sheets-Sheet 1
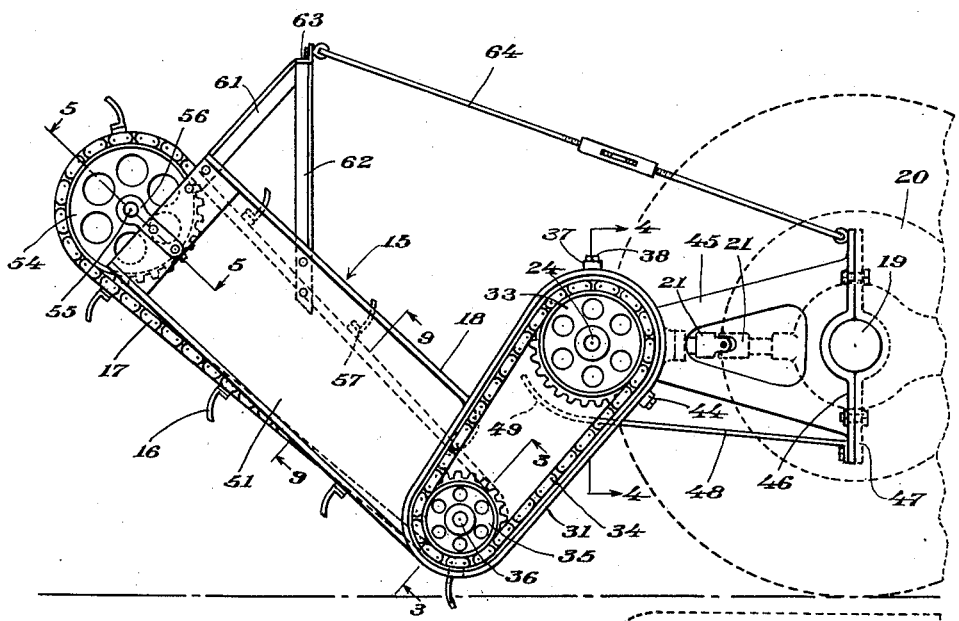
INVENTORS
William L. Tisdale
Furnie G. Tisdale
BY Victor J. Evans & Co.
ATTORNEYS Nov. 29, 1949  W. L. TISDALE ET AL  2,489,834
POWER DRIVE PEANUT SHAKER
Filed March 24, 1947  3 Sheets-Sheet 2

INVENTORS
*William L. Tisdale*
*Furnie G. Tisdale*
BY *Victor J. Evans & Co.*
ATTORNEYS Nov. 29, 1949 W. L. TISDALE ET AL 2,489,834
POWER DRIVE PEANUT SHAKER
Filed March 24, 1947 3 Sheets-Sheet 3
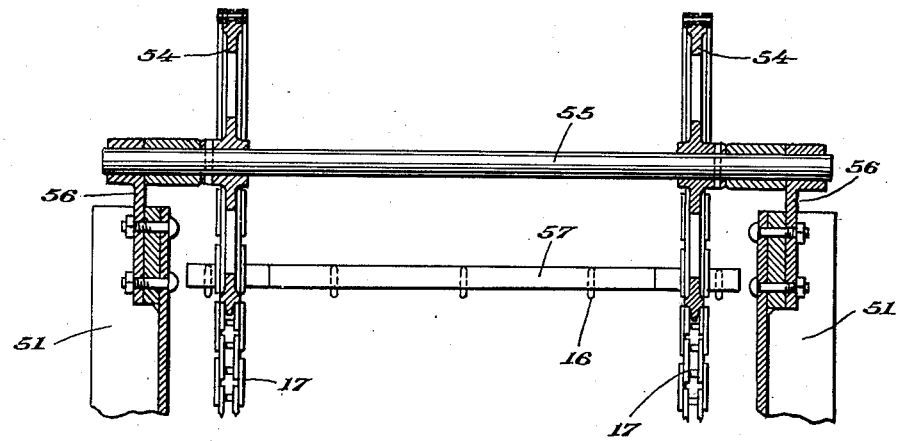
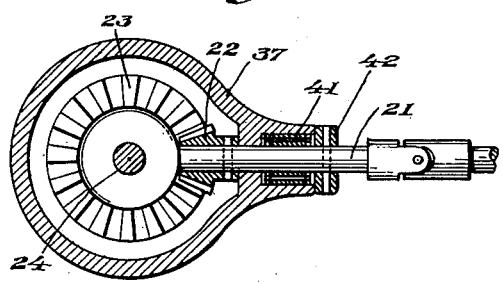
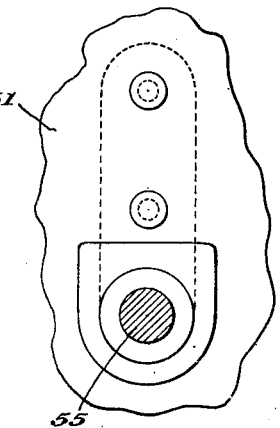
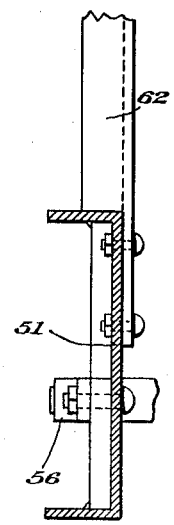
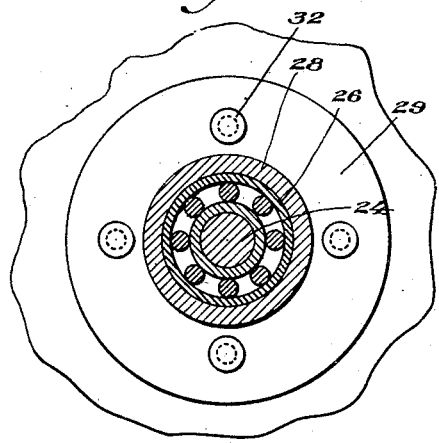
INVENTORS
*William L. Tisdale*
*Furnie G. Tisdale*
BY *Victor J. Evans & Co.*
ATTORNEYS Patented Nov. 29, 1949

2,489,834

UNITED STATES PATENT OFFICE 2,489,834

POWER DRIVE PEANUT SHAKER

William L. Tisdale and Furnie G. Tisdale,
Montgomery, Ala.

Application March 24, 1947, Serial No. 736,678

4 Claims. (Cl. 55—51)

This invention relates to power driven peanut shakers adapted for attachment to tractors in a direct connected manner.

It is an object of the present invention to provide a peanut shaker for tractors whereby the cost of harvesting peanuts can be reduced and wherein the shaker can be inexpensive to manufacture and can be easily installed upon the tractor.

It is another object of the present invention to provide a peanut shaker adapted to be attached to the rear of the tractor and having fingers for lifting the peanut vines and to carry them up an incline wherein the fingers are provided on a chain and adapted so that only in the lowered position will they engage the ground so that at times of transport the fingers can be adjusted so as not to be in contact and whereby the construction can be kept simple in that no adjusting equipment is necessary to effect a lifting of the shaker upon the tractor at times of transport.

It is another object of the present invention to provide a peanut shaker whereby the driving chain and the conveyor belt will be adequately enclosed so as to give protection to individuals who may come near to the shaker on going behind the tractor.

For other objects and for a better understanding of the invention, reference may be had to the following detailed description taken in connection with the accompanying drawing, in which Fig. 1 is a side elevational view of the shaker and of the rear of the tractor to which it is directly connected.

Fig. 2 is a top plan view of the peanut shaker and of the rear of the tractor and particularly the rear axle housing thereof to which the shaker is attached.

Fig. 5 is a fragmentary view, in section, taken through the upper end of the conveyor and as viewed on line 5—5 of Fig. 1 and looking in the direction of the arrows thereof.

Fig. 6 is a longitudinal cross-sectional view of the main drive and as viewed on line 6—6 of Fig. 2 and looking in the direction of the arrows thereof.

Fig. 7 is an enlarged cross-sectional view taken on line 7—7 of Fig. 4 and looking in the direction of the arrows thereof and through one of the bearings of the main drive shaft.

Fig. 8 is an enlarged fragmentary and detail view, in section, and taken on line 8—8 of Fig. 3 and looking in the direction of the arrows thereof and upon the bearing for the top conveyor shaft.

Fig. 9 is a fragmentary and detail view, in section, taken through one of the side guide members.

Figure 3:
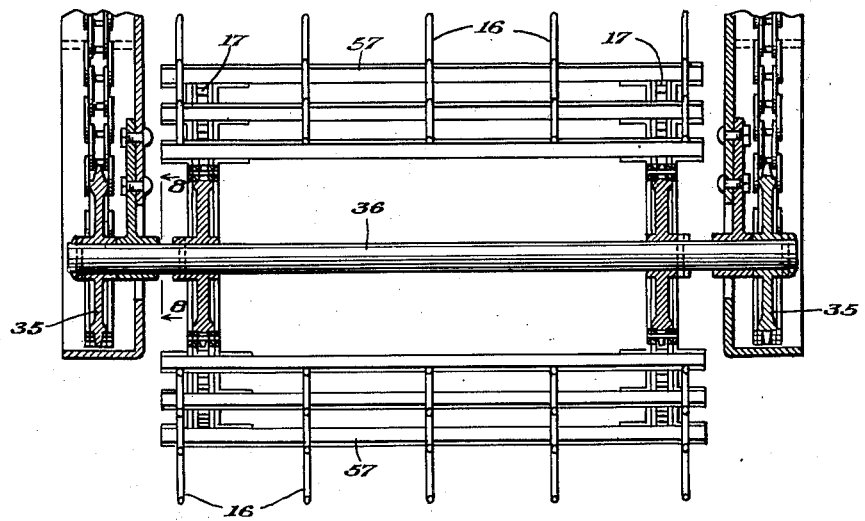
Fig. 3 is a transverse cross-sectional view taken through the driving connection of the drive chain with the sprocket of the conveyor and as viewed on line 3—3 of Fig. 1 and looking in the direction of the arrows thereof.

This invention comprises generally a power driven shaker 15 having a plurality of steel fingers 16 and a conveyor chain 17 of the endless type. The entire shaker mechanism is set in a small compact frame 18 adapted to be attached to a rear axle housing 19 of a tractor 20. The shaker derives its power from the tractor through a rearwardly extending flexible drive shaft 21 connected by a spur 22 with a bevel plate gear 23 on a main transversely extending drive shaft 24. As will be apparent as the description continues, the operating mechanism is enclosed to prevent entrance of dirt or other matter into the working parts. The use of direct gearing and sprocket gears assures positive delivery of maximum power, and thus precluding the possibility of jamming when even the heaviest runner type peanut vines are pulled.

Figure 4:
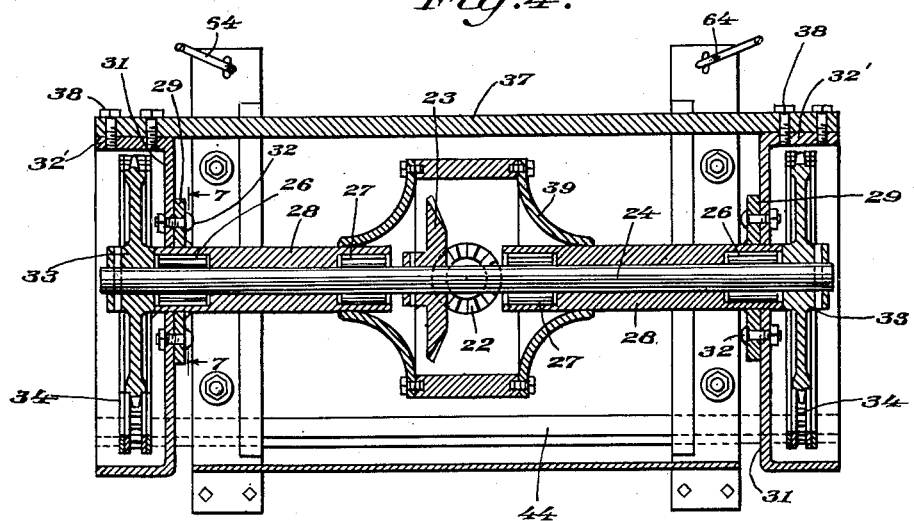
Fig. 4 is an enlarged transverse cross-sectional view taken through the main transversely extending driving shaft and on line 4—4 of Fig. 1 and looking in the direction of the arrows thereof.

The transverse shaft 24 is journalled in roller bearing elements 26 and 27 contained in transversely extending sleeves 28 having a flange 29 by which the sleeve can be secured to a side guard member 31 by bolts 32. The guard 31 has a laterally extending flange 32 in which is housed a sprocket 33 fixed to shaft 24, a chain 34, a sprocket 35 on a drop shaft 36, and adapted to be driven thereby. The guards 31 at the opposite sides of the shaker are tied together by a transverse bar 37 extending across the tops of the same and secured to the laterally extending portions 32 by bolts 38. On the sleeve 28 is an axle housing 39 for covering the bevel gear 23, Fig. 4, and the spur 22. The forward end of the housing serves as a journal bearing support for the flexible shaft 21. This housing 39 can be packed with grease. The shaft 21 is journalled on a roller bearing element 41 contained in the housing 37 and fixed thereto by a retaining element 42, Fig. 6. A transverse member 44, Fig. 4, ties the lower edges of the guards 31 together.

Welded to the sleeves 28 are forwardly extending brackets 45 having attaching portions 46 thereon specially formed so that the end of the bracket will surround one half of the axle housing 19 of the tractor and so as to match with a clamping plate 47 which when secured to the attaching portion 46 rigidly secures the shaker to the rear axle of the tractor. On this attaching portion 46 at its bottom end there is rigidly connected a guard plate 48 which extends rearwardly under the drive shaft 21 and under the housing 39 and sleeves 24, whereby to protect these parts from being engaged by the vines whereupon the vines would become entangled therewith and also to guide these vines in their rearward movement when picked up by the steel fingers 16. It will be noted as indicated at 49 that the end of the plate 48 is curled up under the housing 39.

Inclined upwardly and rearwardly from each one of the guide members 31 is a guard portion 51 for the conveyor-chain 17. The conveyor chain 17 connects with sprockets 52 on a shaft 36. The chain 17 is supported at its upper end upon sprockets 54 on a shaft 55 extending into removable bearing elements 56 connected to the upper end of the inclined guide portions 51. Transverse members 57 are connected between the chains 17 and these members carry the steel fingers 16.

Extending upwardly from the inclined portions of the guards are angle members 61 and 62 which are connected together at their upper end by a transversely extending angle piece 63 which is in turn connected by rods 64 having turn buckles therein to the attaching portions 46 of the brackets 45 whereby to provide adequate bracing for supporting the rear end of the peanut shaker .

It will be understood that in operation the plows or other elements on the tractor which effect much of the digging operation of the peanuts will loosen the vines and thereafter as the tractor proceeds down the row the peanut shaker of the present invention will pick-up by the steel fingers the vines of the peanuts and cause them to be conveyed over the conveyor whereby to shake out any dirt from the same and to deliver from the ends of the peanut shaker a clean batch of entangled peanut vines. These vines will be deposited on the ground bottom up and a quick drying of the same will thereafter be effected.

It will be apparent that this power drive peanut shaker has been developed with a view to provide a sturdy but relatively small and light weight construction sufficiently powerful to uproot double rows of the most obstinate brush or runner type of peanut vines without the danger of jamming the mechanism and thus causing a halt in the operation. When the peanut shaker is not in operation it may be cleared of the ground simply by stopping the fingers at the proper point. Also this peanut shaker permits the tractor to be turned in very small space.

Having now described our invention, we claim:

1. A direct connected peanut shaker adapted to be attached to the rear axle housing of a tractor comprising a transversely extending drive shaft, a housing including sleeves fitted about the drive shaft, a bevel gear on the shaft and within the housing, brackets connected to the sleeves about the shaft and extending forwardly and having an attaching portion adapted to fit the rear axle of a tractor, clamping means for making secure the brackets to the rear axle of the tractor, a flexible drive shaft having a gear within the housing and engaging with the bevel gear on the shaft and extending forwardly for attachment to the power drive of the tractor, a frame connected to the sleeve and extending downwardly and rearwardly, a drop shaft journalled in the lower end of the frame, chain and sprocket means extending between the two shafts for driving the drop shaft, said frame having upwardly and rearwardly inclined side portions, a shaft connected to the upper end of the side portions, and an endless conveyor extending between the drop shaft and the shaft connected to the upper end of the side portions, said endless conveyor having steel fingers extending outwardly therefrom and adapted to enter the ground at the point where the conveyor turns about the drop shaft to pick-up the peanut vines and to cause the same to be drawn upwardly and inwardly between the drive shaft housing and the drop shaft so as to be conveyed upwardly by the conveyor to shake out the dirt therefrom.

2. A direct connected peanut shaker as defined in claim 1 and a bottom guard plate attached to the forwardly extending brackets and extending rearwardly under the drive shaft and the housing and sleeves to keep the vines from becoming entangled with the drive shaft and over the housing sleeves and to guide them onto the endless conveyor.

3. A direct connected peanut shaker as defined in claim 1 and bracket members extending upwardly from the rear end of the rearwardly and upwardly inclined portions of the frame, and adjustable rod means connecting the upper ends of the brackets with the attaching portions of the housing brackets attached to the tractor rear axle housing whereby to support the rear end of the shaker frame.

4. A direct connected peanut shaker as defined in claim 1 and removable bearing members connected to the upper end of the upwardly and rearwardly inclined portions of the frame while supporting the conveyor shaft.

WILLIAM L. TISDALE.
FURNIE G. TISDALE.

REFERENCES CITED

The following references are of record in the file of this patent:

UNITED STATES PATENTS

| Number | Name | Date |
| --- | --- | --- |
| 1,389,015 | Smith | Aug. 30, 1921 |
| 1,869,641 | Wilson | Aug. 2, 1932 |